US008678519B2

(12) United States Patent
Yamamoto et al.

(10) Patent No.: US 8,678,519 B2
(45) Date of Patent: Mar. 25, 2014

(54) SPOKE WHEEL AND SPOKE USING THEREFOR

(75) Inventors: Toshihiro Yamamoto, Kaga (JP);
Akiyoshi Komeya, Kaga (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 294 days.

(21) Appl. No.: 13/024,043

(22) Filed: Feb. 9, 2011

(65) Prior Publication Data
US 2011/0193402 A1    Aug. 11, 2011

(30) Foreign Application Priority Data

Feb. 10, 2010   (JP) .................................. 2010-027643
Nov. 9, 2010    (JP) .................................. 2010-251307

(51) Int. Cl.
   *B60B 1/02*    (2006.01)
(52) U.S. Cl.
   USPC ............................................................ 301/56
(58) Field of Classification Search
   USPC ....................................... 301/55, 58, 59, 104
   See application file for complete search history.

(56) References Cited

U.S. PATENT DOCUMENTS

| 457,286 A | * | 8/1891 | Fletcher ......................... 101/282 |
| 6,024,413 A | * | 2/2000 | Dixon et al. .................... 301/58 |
| 2007/0145813 A1 | * | 6/2007 | D'Aluisio ....................... 301/59 |

FOREIGN PATENT DOCUMENTS

| JP | 4-37001 | 3/1992 |
| JP | 2007-118936 | 5/2007 |

OTHER PUBLICATIONS

Machine translation of DE 29800324.*

* cited by examiner

*Primary Examiner* — S. Joseph Morano
*Assistant Examiner* — Jean Charleston
(74) *Attorney, Agent, or Firm* — Jordan and Hamburg LLP (57) ABSTRACT

Large impacts act on a spoke wheel and spokes fastened by nipples tend to be loosened when a racing off-road motorcycle and the like repeatedly jumps and lands. A hub is connected with a rim by using deformed spokes each having a deformed portion. The deformed spoke is fastened while being elastically deformed so that the deformed portion extends by the nipple. As compared to a straight spoke, the deformed spoke has low longitudinal elastic modulus and substantially the same stiffness with a spoke having an equal diameter.

12 Claims, 10 Drawing Sheets

FIG.5A e = CONSTANT (CHANGE a AND c)

FIG.5B

CHANGE c(e)

FIG.5C

CHANGE a(e)

FIG.5D

CHANGE b

Prior Art

SPOKE WHEEL AND SPOKE USING THEREFOR

CROSS REFERENCE TO RELATED APPLICATIONS

This application claims the foreign priority benefit under Title 35, United States Code, §119 (a)-(d) of Japanese Patent Application No. 2010-027643, filed on Feb. 10, 2010 in the Japan Patent Office, the disclosure of which is herein incorporated by reference in its entirety.

BACKGROUND OF THE INVENTION

1. Field of the Invention

The present invention relates to a spoke wheel in which a rim is connected with a hub by a large number of spokes and more specifically to a spoke wheel and to spokes thereof suitably used for two-wheel vehicles such as a motorcycle and a bicycle.

2. Related Art

A wheel for use in a two-wheel vehicle is composed of a hub mounted to a wheel axis, a rim mounted with a tire and spokes that connect the hub with the rim in general. While there are two kinds of wheels of a cast wheel in which the rim, spokes and hub are unitarily molded by means of casting and a spoke wheel (or more precisely a wired spoke wheel) in which the rim is connected with the hub by a large number of wired spokes, the invention relates to the spoke wheel. The spoke wheel can absorb impacts acting on the wheel by the rim and spokes that are deformable and off-road motorcycles mostly adopt the spoke wheel.

Figure 8:
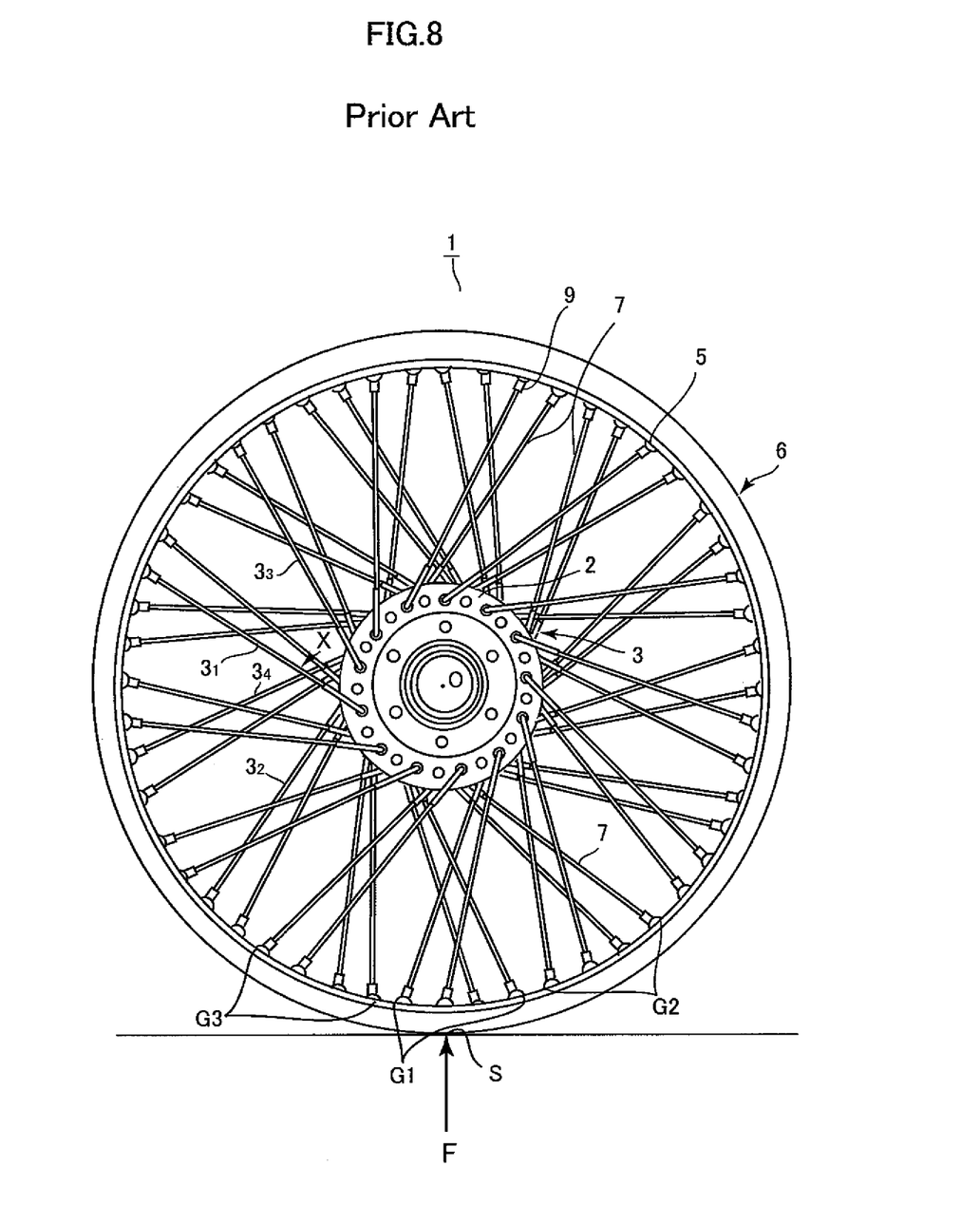
FIG. 8 is a front view of a spoke wheel composed of prior art straight spokes.
Figure 9:
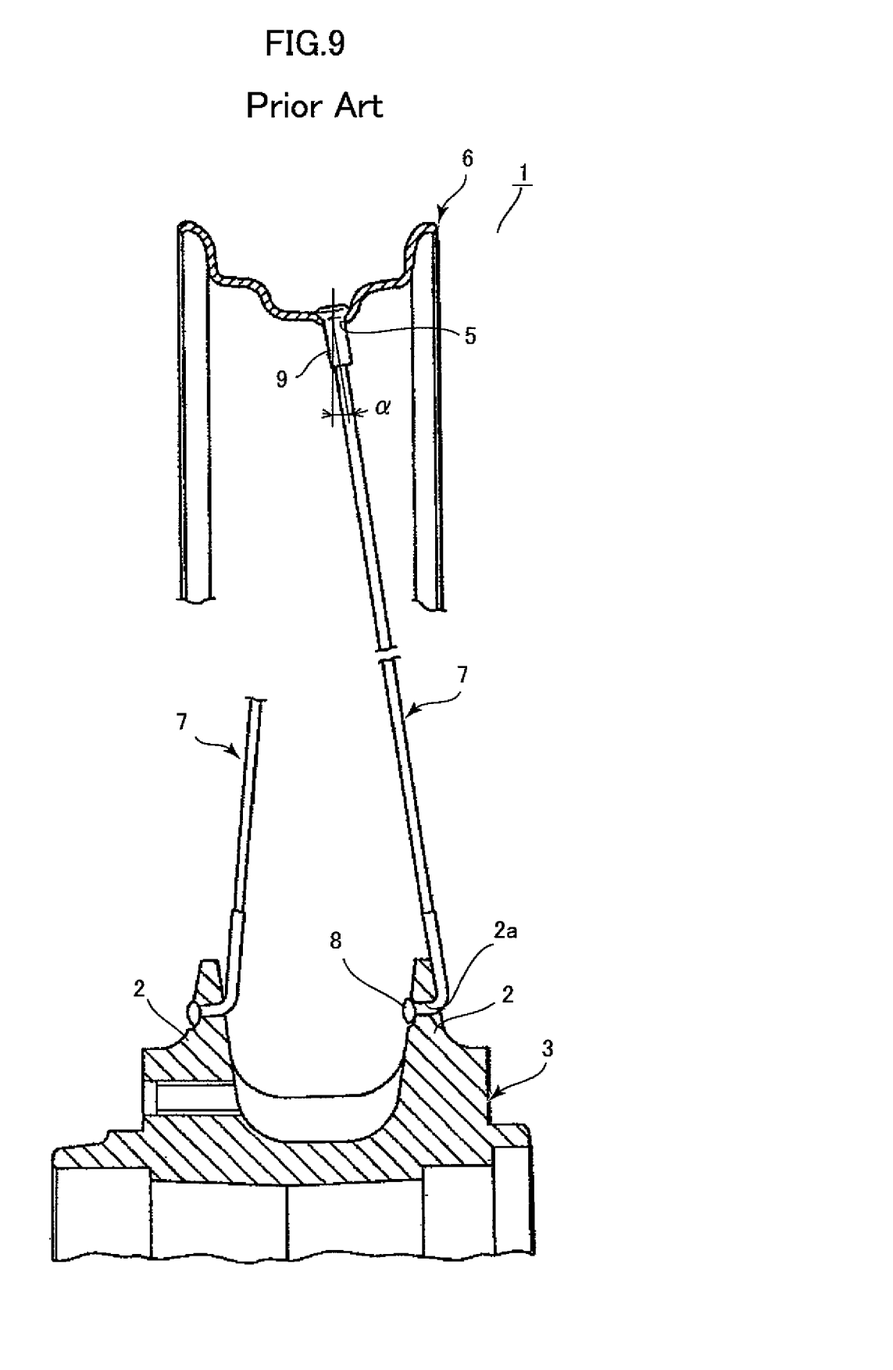
FIG. 9 is a side section view of the prior art spoke wheel.

As shown in FIGS. 8 and 9, a spoke wheel 1 is composed of a hub 3 having two flanges 2 disposed to be distant from each other in an axial direction by a predetermined distance, a rim 6 having a large number of spoke mounting concave hole portions 5 and straight wired spokes 7 each having a portion to be retained (referred to as a 'retained portion' hereinafter) 8 at one end thereof and a male screw portion at another end.

Each spoke 7 is tensioned between the hub 3 and the rim 6 by way of anchoring the retained portion 8 by inserting through a hole 2a of the flange 2 of the hub 3 and of fastening the male screw portion at the other end with a nipple 9 held by the concave hole portion 5 of the rim 6. The spokes 7 are tensioned at equal intervals along the whole circumference of the rim so that the four spokes in total that penetrate through the both flanges 2 of the hub 3 respectively from the outside and inside of the flanges intersect with each other and so as to have an elevation angle α as shown in FIG. 9. The spokes 7 are adjusted so that the rim 6 keeps a circular shape in plane.

While FIGS. 8 and 9 show the spoke wheel in which no tire is mounted, the spoke wheel 1 in a state in which a tire is mounted to the rim 6 may be attached to motorcycles and to off-road motorcycles for races such as motocross and Enduro in particular. While a load applied from a vehicle body acts concentratedly on a landing part S of the spoke wheel 1, a large impact load Facts on the landing part S when the racing motorcycle jumps and lands in particular. While the impact load acts so as to flatten the rim 6 through the tire and as a result, a compressive force acts on a spoke group G1 near the landing part S, tensile forces also act on spoke groups G2 and G3 neighboring the spoke group G1.

The spoke wheel 1 excels in that it can absorb the impacts described above by elastic deformation of the rim 6 and the spokes 7. When the straight spoke 7 is thinned, although stiffness of the spoke wheel drops and the shock absorption is improved, the spoke is prone to break because tensile strength of the straight spoke 7 also drops. Still more, while stiffness of the spoke wheel includes lateral stiffness against a lateral load acting during cornering, beside the vertical stiffness against the load in a direction of F (vertical direction) described above, there is a problem that the vehicle may wobble if the lateral stiffness is insufficient.

Still more, although the straight spoke 7 is fixed to the rim with the predetermined tension applied by the nipple 9 and engagement with the nipple 9 is maintained and the straight spoke 7 will not be loosened within a range in which the tension acts, the straight spoke 7 is prone to be loosened and the spoke wheel 1 may not be able to maintain an adequate shape as a spoke wheel if the compressive force acting on the spoke group G1 part exceeds the tension applied to the spokes.

Meanwhile, there is also proposed a wheel that absorbs shocks by elastic deformation of spokes by forming the spoke into an elastically deformable shape (see Japanese Patent Application Laid-open No. 2007-118936 or Utility Model Application Laid-open No. Hei.4 (1992)-37001).

When the spoke wheel 1 composed of the straight wired spokes 7 is attached to the racing off-road motorcycle in particular, longitudinal elastic modulus (Young's modulus) is relatively large because the spokes 7 are straight. Then, the spokes are prone to be loosened when large impact loads act repetitively and it is cumbersome to adjust the spokes. Still more, if the spoke is thinned to enhance the impact absorption, the spoke is prone to be broken.

The wheel disclosed in Japanese Patent Application Laid-open No. 2007-118936 is a wheel for a bicycle. The wheel has spokes each having a flexible portion formed into a shape of S for example. The wheel is arranged so as to absorb energy of vibrations by dislocating the center of a hub on which weight and others of a vehicle body acts to a lower position with respect to the center of a rim by large elastic deformation caused by the flexible portion and by alternately and repeatedly causing compressive and tensile actions on the flexible portions as the wheel rotates. This wheel cannot be applied to motorcycles and the like that receive much heavier load by any possibility.

A wheel disclosed in Utility Model Application Laid-open No. Hei.4 (1992)-37001 is a wheel for a bicycle in which a hub (mounting portion), a rim and spokes are unitarily molded by synthetic resin. The spoke is provided with an impact absorbing portion formed of an oval ringed frame to alleviate impacts because the wheel molded unitarily by synthetic resin has no shock-absorbing action. That is, this wheel is different from the spoke wheel composed of the wired spokes and having the excellent shock absorption.

SUMMARY OF THE INVENTION

Accordingly, the invention aims at solving the abovementioned problems by providing a spoke wheel and a spoke thereof by deforming conventionally used straight spokes as non-straight spokes and by fixing the deformed spokes between the hub and the rim in the same manner with the conventional spoke wheel.

According to a first aspect of the invention, there is provided a spoke wheel that has a hub, a rim and a large number of wired spokes each having a retained portion at one end thereof and a male screw portion at another end, is arranged so that each spoke is tensioned between the hub and the rim by way of retainably anchoring the retained portion to one of the hub and the rim and of screwing the male screw portion with a nipple retained in the other one of the hub and the rim and has the following characteristics.

That is, at least part of the spokes are deformed spokes each having a deformed portion deformed by a predetermined offset amount between the retained portion and the male screw portion and the deformed spoke is fastened by the nipple so that the deformed portion is elastically deformed in a direction in which the predetermined offset amount is reduced.

Figure 1:
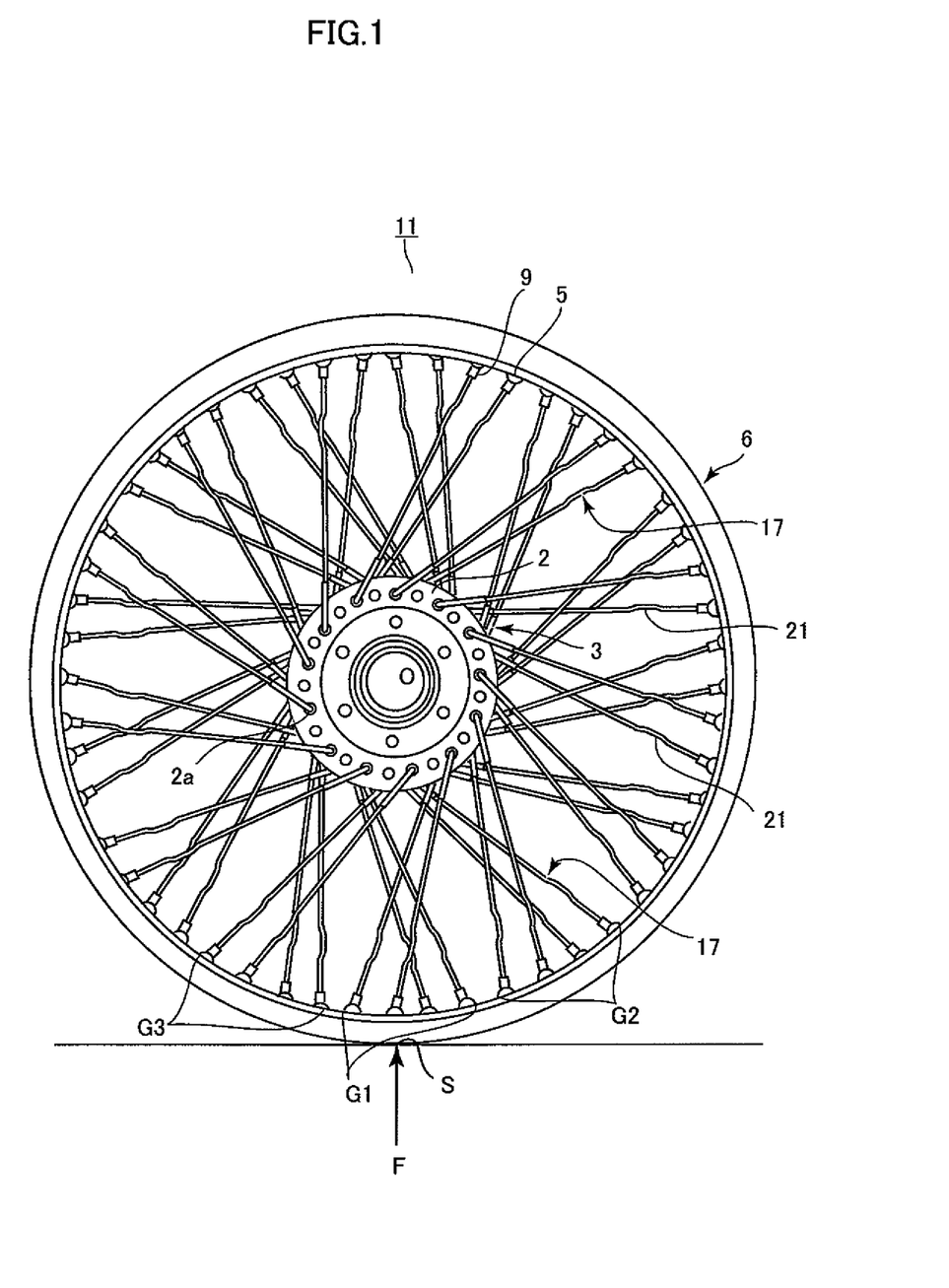
FIG. 1 is a front view of a spoke wheel using deformed spokes of the invention.

According to a second aspect of the invention, all of the spokes tensioned between the hub and the rim are the deformed spokes as shown in FIG. 1 for example.

According to a third aspect of the invention, the deformed spokes are combined with straight spokes in the spokes tensioned between the hub and the rim.

Figure 6:
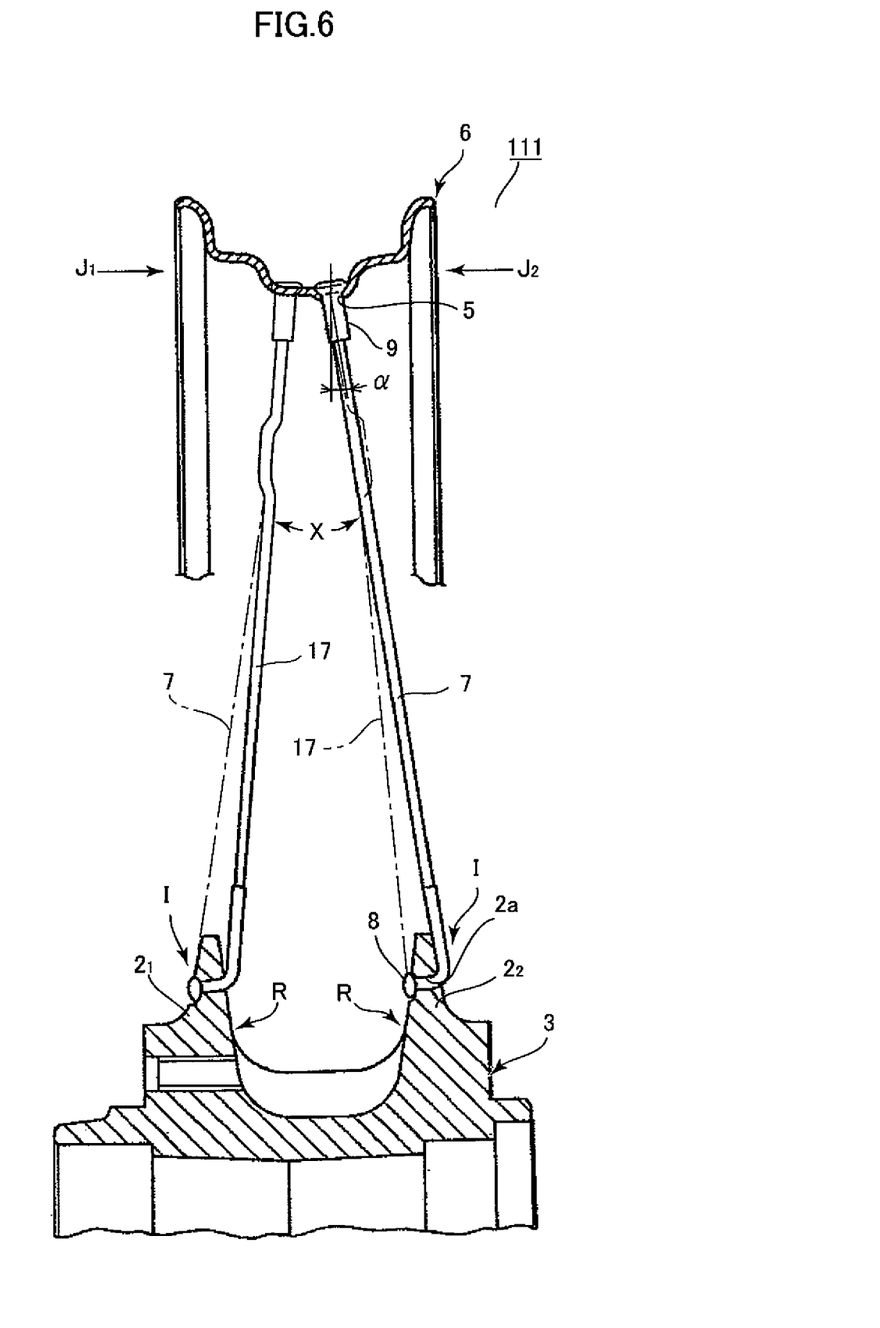
FIG. 6 is a side section view showing a spoke wheel in which the deformed spokes are combined with straight spokes.

According to a fourth aspect of the invention, the hub has two ringed flanges disposed so as to be distant in the axial direction by a predetermined distance and one of a pair of spokes extending from the same flange and intersecting with each other is the deformed spoke and other one is the straight spoke as shown in FIG. 6 for example.

According to a fifth aspect of the invention, the deformed spoke has longitudinal elastic modulus within a range of 0.3 to 0.8 times of that the straight spoke having no deformed portion.

Figure 2:
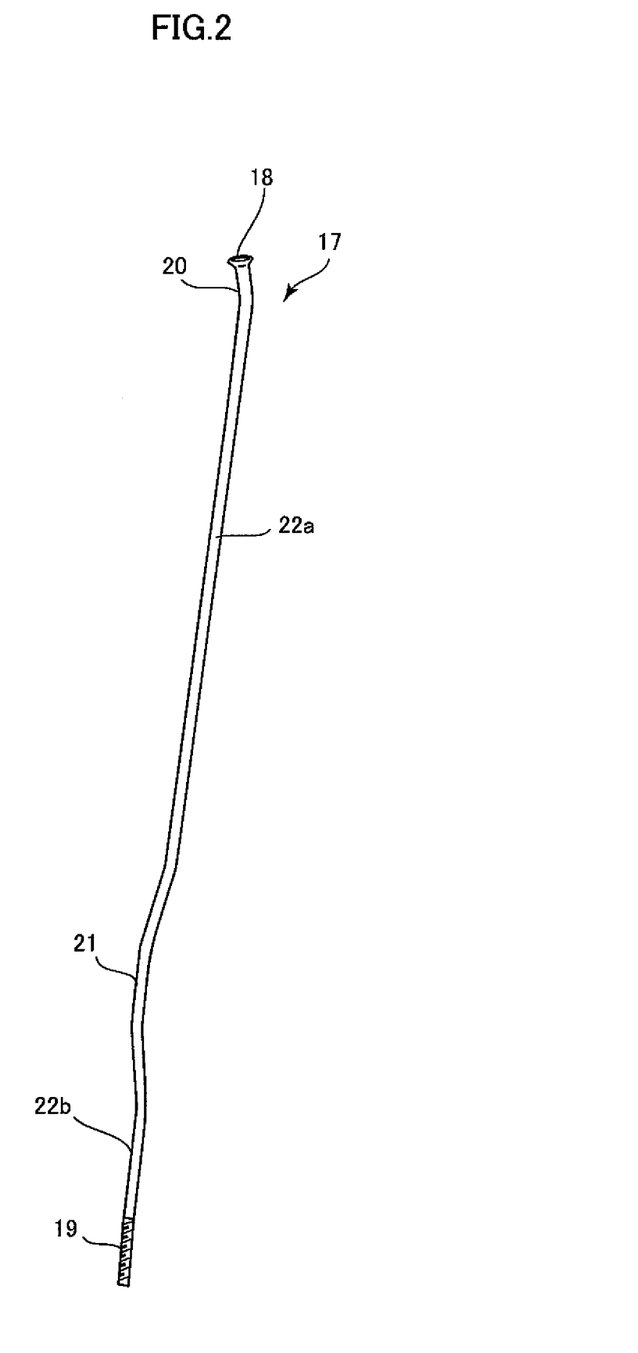
FIG. 2 is a front view of the deformed spoke in a natural state.
Figure 3A:
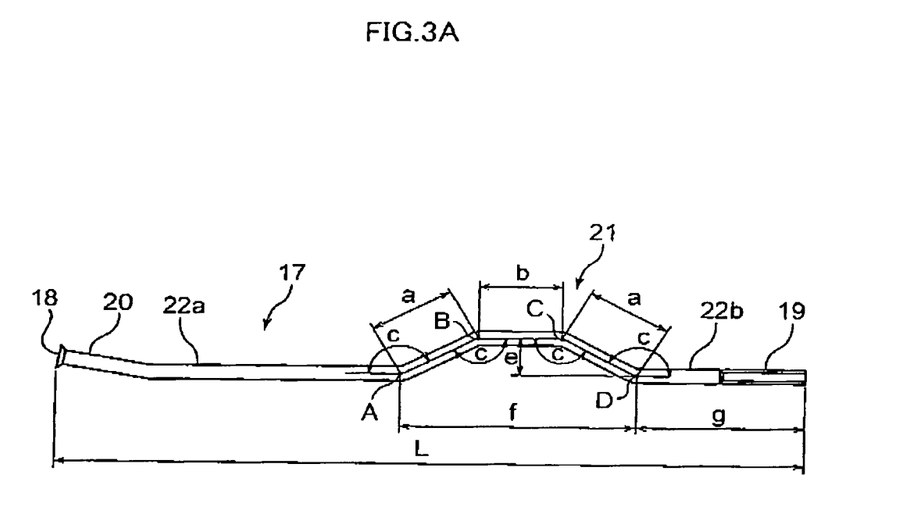
FIG. 3A is a front view of the deformed spoke and FIG. 3B is a front view of a prior art straight spoke.
Figure 3B:
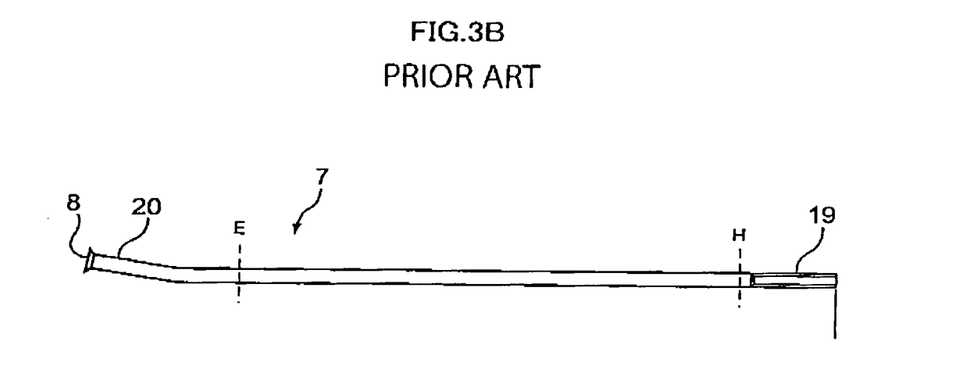

According to a sixth aspect of the invention, preferably the deformed spoke has straight portions on the same axial line respectively on the retained portion side and on the male screw portion side of the deformed portion, he deformed portion has curved portions curved respectively by a predetermined angle with respect to the straight portions on the retained portion and male screw portion sides and a connecting portion that connects ends of these curved portions; and he predetermined offset amount is a distance between the axial line of the straight portions and the connecting portion as shown in FIGS. 2 and 3 for example.

According to a seventh aspect of the invention, a spoke is formed of the deformed spoke used in the spoke wheel.

Specifically, the deformed spoke has straight portions on the same axial line respectively on the retained portion side and the male screw portion side of the deformed portion and he offset amount of the deformed portion falls within a range from 1.1 $\phi$ to 6.2 $\phi$, where the wire diameter is $\phi$, with respect to the axial line of the straight portions.

The deformed spoke has the straight portions on the same axial line respectively on the retained portion side and the male screw portion side of the deformed portion, the deformed portion has curved portions that are curved from the straight portions on the retained portion and male screw portion side respectively with a predetermined angle and is formed by connecting those curved portions and the predetermined curved angle c falls within a range from 150° to 170° and a length of the curved portion falls within a range from 3.1 $\phi$ to 12.5 $\phi$, where the wire diameter is $\phi$.

ADVANTAGEOUS EFFECTS OF THE INVENTION

According to the first aspect of the invention, because the spoke wheel is constructed by using the prior art hub and rim, by using the deformed spokes formed by deforming the prior art spokes at least as part of the spokes and by fastening the deformed spokes by the nipples, the spoke wheel may be manufactured without increasing its cost by employing a conventional spoke wheel manufacturing system. Even though, it is possible to provide the spoke wheel capable of preventing the nipples from being loosened even if impact loads repetitively act thereon by maintaining tension of the spokes because the deformed spoke has longitudinal elastic modulus lower than that of the straight spoke and a soft impact absorbing performance.

According to the second aspect of the invention, because all of the spokes are the deformed spokes, it becomes possible to obtain a spoke wheel having fully high impact absorbing performance by the highly flexible spokes.

According to the third aspect of the invention, because the deformed spokes are combined with the straight spokes, it becomes possible to obtain a spoke wheel having both adequate flexibility and stiffness according to preference of a rider or according to a category of a race such as the motocross and Enduro. For instance, while some riders point out that a machine wobbles at corners when all of the spokes are the deformed spokes because the machine may lack lateral stiffness (depends on how to ride the machine), it is possible to suppress wobbling of the machine at the corners by combining the deformed spokes with the straight spokes at an appropriate rate (at 50% for example) while keeping vertical stiffness at a certain rate.

According to the fourth aspect of the invention, because one (inside for example) of the pair of spokes extending from the same flange and intersecting with each other is the deformed spoke and the other one (outside for example) is the straight spoke, it is possible to reduce wobbling of the vehicle during cornering and the like by suppressing a drop of lateral stiffness by suppressing the highly flexible deformed spoke from deforming by receiving a transverse load by the straight spoke having high stiffness and contacting with the deformed spoke.

According to the fifth aspect of the invention, because the deformed spoke has the longitudinal elastic modulus that is 0.8 times or less of that the straight spoke having no deformed portion, the deformed spoke has excellent impact absorbing performance that is extinguishable from the straight spoke. Still more, because the longitudinal elastic modulus of the deformed spoke is 0.3 times or more of the straight spoke, it is possible to reduce a sense of strangeness that the rider might feel when the spoke is too flexible.

According to the sixth aspect of the invention, because the deformed spoke has the deformed portion constructed simply by the curved portions and connecting portion beside the straight portions on the retained portion side and the male screw portion side, it is possible to provide the spoke wheel having the simple design and readily manufactured.

According to the seventh aspect of the invention, it is possible to provide the spoke wheel described above by using the conventional spokes and by readily fabricating the deformed spoke by bending to form the deformed portion.

The specific nature of the invention, as well as other objects, uses and advantages thereof, will clearly appear from the following description and from the accompanying drawings.

BEST MODE FOR CARRYING OUT THE INVENTION

As shown in FIG. 1, a spoke wheel 11 of the invention is composed of a hub 3, a rim 6 and spokes 17. The same spoke wheel 1, the hub 3 and the rim 6 of the prior art shown in FIGS. 8 and 9 are used in the spoke wheel 11 and only all the spokes are changed from the prior art straight spokes 7 to deformed spokes 17. Accordingly, the hub 3 has two flanges 2 disposed so as to be distant from each other in the axial direction by a predetermined distance and the rim 6 has a large number of concave hole portions 5 that hold the same nipples 9 with the prior art nipples to fasten the deformed spokes 17.

As shown in FIG. 2, each deformed spoke 17 of the invention has a retained portion (head) 18 at one end thereof and a male screw portion 19 that is screwed with the nipple 9 at another end. Formed in the deformed spoke 17 between the both ends are a curved portion 20 for penetrating a vicinity of the retained portion 18 through a hole 2a of the flange 2, a predetermined deformed portion 21 on the male screw portion side and straight portions 22a and 22b on the both sides of the deformed portion 21.

The deformed spoke 17 is penetrated through the hole 2a of the flange 2 from the side of the male screw portion 19 and is retained by the retained portion 18. The nipple 9 fitted into the concave hole portion 5 of the rim 6 from the radially outward (drop) direction of the rim is screwed with the male screw portion 19. Then, the spoke wheel 11 is assembled by connecting the hub 3 with the rim 6 by the spokes 17. At this time, the respective deformed spokes 17 are inserted from the both inside and outside of the two hub flanges 2 so as to form one group by four spokes in the same manner with the prior art spokes 7 and so as to form a predetermined elevation angle α. Then, the nipples 9 are fastened and adjusted so that a predetermined tension is applied so that the hub 3 and the rim 6 have the same axis O and so that the rim 6 forms an accurate circle in plane.

Next, performances of the deformed spoke 17 of the invention as compared with those of the prior art straight spoke 7 will be explained with reference to FIGS. 3 through 5.

As shown in FIGS. 3A and 3B, the deformed spoke 17 and the straight spoke 7 are formed of the same material and into a linear shape having the same length. For instance, the material thereof is SWB (hard wire steel: JPSG3521), the length L in a natural condition not fixed to the wheel is 240 mm and a wire diameter is 3.2 mm. It is noted that the diameter of the both end parts (outside parts from points E and H of the spoke) having the curved portion 20 and the male screw portion 19 is slightly thick and is 3.5 mm.

A deformed portion 21 of the deformed spoke 17 has a base-end-side straight portion 22a, an end-side straight portion 22b, curved portions a that are curved respectively with a predetermined angle (curved angle) c and a parallel portion b that is curved from these curved portions with the predetermined angle (curved angle) c. Thereby, the parallel portion b is deformed with respect to the straight portions 22a and 22b by a predetermined offset amount e. That is, ends of the curved portions a may be directly connected with each other or may be connected curvedly. The part b composes a connecting part in such cases. It is noted f in FIG. 3A is a length of the deformed portion 21 in a natural condition and g is a length from the end of the spoke to the deformed portion 21. FIG. 3B show the prior art straight spoke 7 that has the retained portion 8, the curved portion 20 and the male screw portion 19 similarly to the deformed spoke 17, except of that it has no deformed portion 21.

In the present embodiment, the respective sizes are set as follows: the predetermined angle (curved angle) c=160°, the curved portion a=20 mm, the parallel portion b=20 mm and the length g to the deformed portion=50 mm.

Figure 4A:
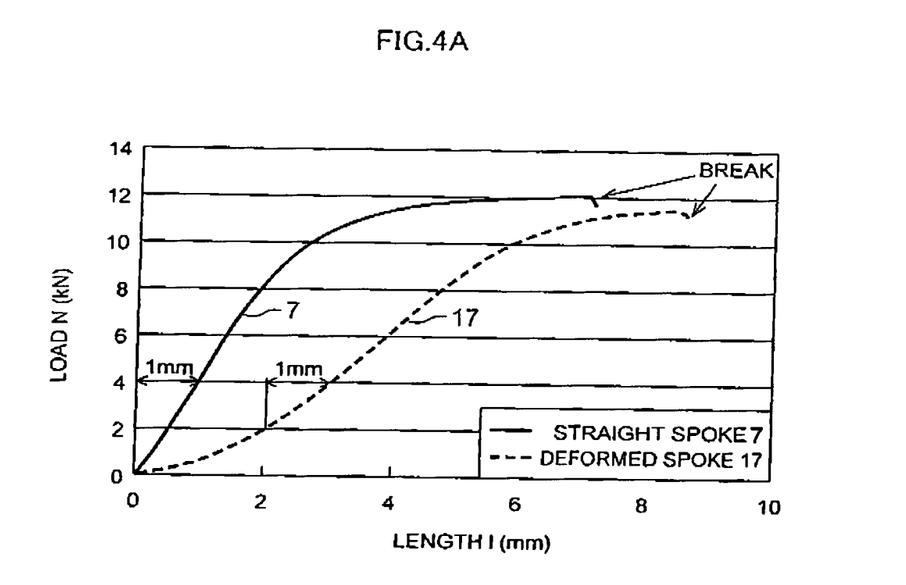
FIG. 4A is a graph showing results of tensile tests of the deformed spoke and the straight spoke and FIG. 4B shows an outline of a tensile tester of the test.
Figure 4B:
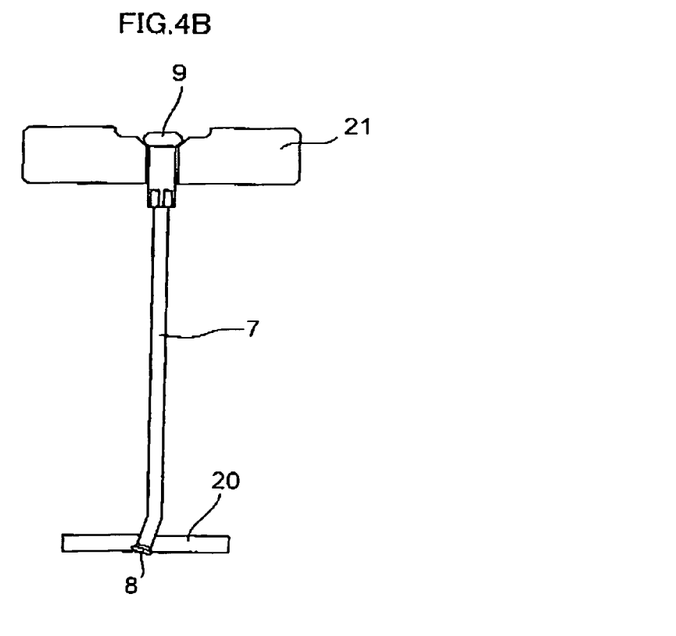
Figure 5A:
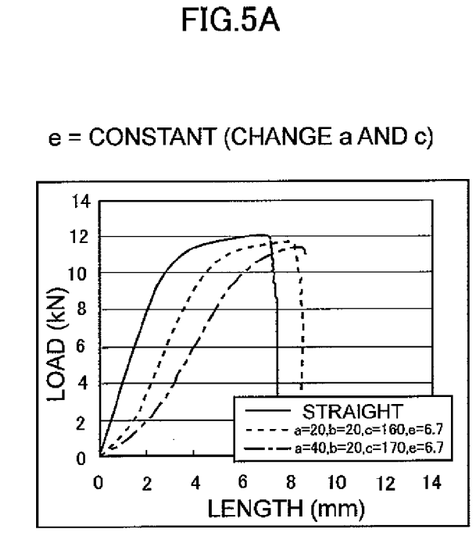
FIGS. 5A, 5B, 5C and 5D are graphs showing results of tensile tests carried out while changing each size of the spoke.
Figure 5B:
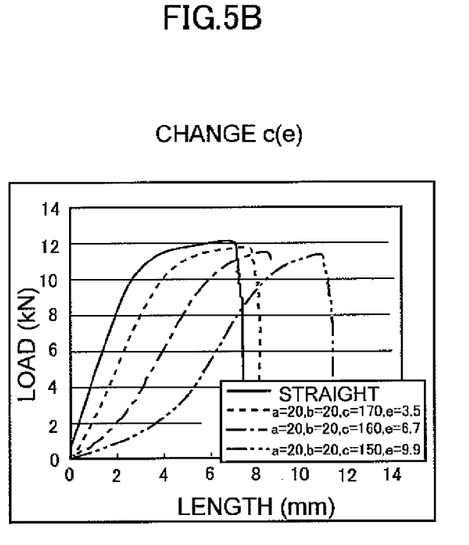
Figure 5C:
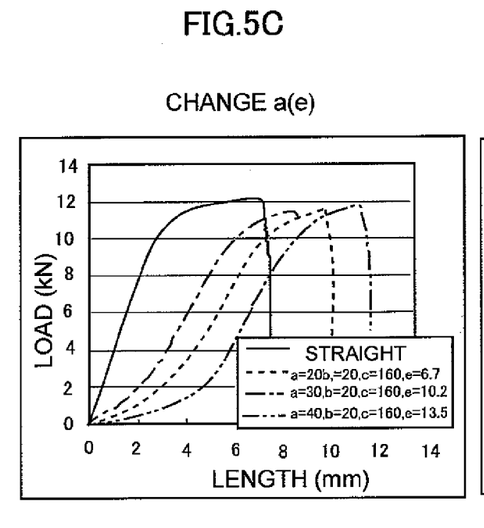
Figure 5D:
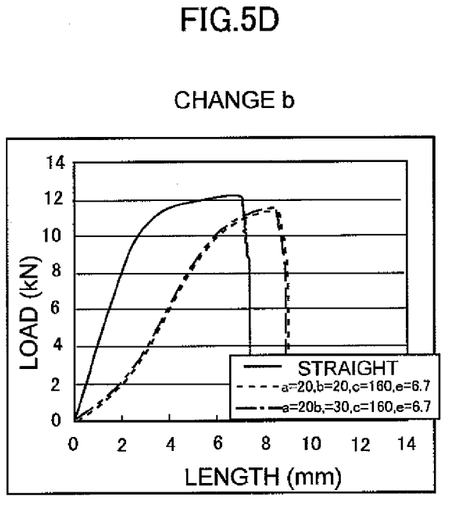

FIG. 4A shows results of tensile tests carried out on the deformed spoke 17 of the embodiment and on the straight spoke 7 having the same material, diameter and length with those of the deformed spoke 17. The tests were carried out by fixing the retained portions 8 and 18 of the spokes 7 and 17 respectively to a fixing portion of a tester and by temporarily jointing the male screw portion to a movable part of the tester through the intermediary of the nipple 9 as shown in FIG. 4B. Although no fastening force N caused by the nipple 9 is applied in the tensile tester, the equal tension 4 kN acts on the deformed spoke 17 and the straight spoke 7 in the spoke wheels 1 and 11 shown in FIGS. 1 and 8 by the fastening force of 4 kN. It is noted that because the deformed spoke 17 has low longitudinal elastic modulus as compared to the straight spoke 7 as described later, it becomes relatively easy to adjust the fastening force in fastening the spoke by the nipple 9 as the spoke is fastened by being rotated more.

As shown in FIG. 4A, the deformed spoke 17 extends with moderate longitudinal elastic modulus (Young's modulus) that is about ⅓ of that of the straight spoke 7 and breaks with substantially equal load (about 12 kN). This means that the deformed spoke 17 has a soft impact absorbing performance because the curved angles c at the curved points A, B, C and D of the deformed portion 21 shown in FIG. 3A are elastically deformed and that the deformed spoke 17 has tensile strength substantially equal to that of the straight spoke by the diameter φ. It is noted that the deformed spoke 17 elastically deforms so that the curved angles c are opened, the offset amount e is reduced and the length f of the deformed portion is prolonged. Still more, while the straight spoke 7 is prone to be broken at the deformed parts (the parts E and H described above), the deformed spoke 17 is prone to be broken at the deformed parts after when the deformed portion 21 is straightly extended.

Furthermore, when a compressive force F acts on the spoke group G1 at the landing part S by the impact load acting on the rim 6 and the group deforms by 1 mm, the tension applied to the straight spoke 7 by the nipple 9 become zero and the spoke is loosened. In the case of the deformed spoke 17 however, even if the spoke deforms by 1 mm in the compressive direction, the tensile force of 2 kN is still acting on the spoke and the spoke is not loosened.

Accordingly, the spoke wheel 11 (see FIG. 1) assembled by using the deformed spokes 17 of the invention may be favorably used for the off-road motorcycles and for the racing motorcycles such as the motocross and Enduro that repeat jumps, causing a large impact load to act on the wheel. That is, the spoke wheel 11 can bring about such favorable effects that it is capable of absorbing the impact load described above softly by the low longitudinal elastic modulus caused by the deformed spoke 17, allows fatigue of its riders to be alleviated and their concentration to be kept and keeps favorable wheel performances by preventing looseness of the spokes otherwise caused by blind moves of the nipples.

FIG. 5 shows results of tensile tests carried out by varying the respective portions a, b and c of the deformed spoke 17 (see FIG. 3A). FIG. 5A shows a case when the curved angle c and the length of the curved portion a are varied while keeping the offset amount e constant. It can be seen that an influence of the curved angle c is large when the offset amount e is kept constant. FIG. 5B shows a case when the offset amount e is changed by varying the curved angle c while keeping the length of the curved portion a and of the parallel portion b constant. It can be seen that the smaller the curved angle c, the more the spoke tends to be prolonged in this case. FIG. 5C shows a case when the offset amount e is changed by varying the length of the curved portion a while keeping the curved angle c constant. It can be seen that the longer the length of the curved portion a, the spoke tends to be prolonged from this case. FIG. 5D shows a case when the length of the parallel portion b is changed. It can be seen that there is no influence to the elongation even if the length of the parallel portion b is changed.

From the results described above, the longer the length of the curved portion a and the smaller the curved angle c, the more the spoke is extendable. That is, the larger the offset amount e, the more the deformed spoke 17 is extendable. The deformed spoke is unable to fully exhibit its flexibility when the longitudinal elastic modulus is 0.3 times or less of the straight spoke 7 and the riders feel a sense of strangeness when the longitudinal elastic modulus is 0.8 times or more because it is too flexible, so that the longitudinal elastic modulus is preferable to be within a range from 0.3 to 0.8 times of that of the straight spoke.

The flexibility of the deformed spoke is not enough when the offset amount e=3.5 mm or less in a natural condition (not fastened by the nipple) and the flexibility is too flexible when the offset amount exceeds e=19.8 mm. That is, the offset amount e is preferable to fall within the range from 3.5 to 19.8 mm, i.e., 1.1 $\phi$ to 6.2 $\phi$, where the wire diameter is $\phi$ (3.2 mm). The predetermined curved angle c is also preferable to fall within a range from 150° to 170° and the length of the curved portion a is preferable to fall within a range from 10 to 40 mm, i.e., within a range from 3.1 $\phi$ to 12.5 $\phi$, where the wire diameter is $\phi$ (3.2 mm).

It is noted that the length of the parallel portion b of the deformed portion 21 is nothing to do with the elongation of the spoke, so that the parallel portion b may be nonexistent or may be prolonged substantially along the whole length of the spoke. For instance, it may be what the ends of the both curved portions a are directly connected with a curved angle [2(c −90°)] or the whole deformed portion 21 may be curved as a circular arc and the like. Still more, the curved portions a may be located in the vicinity of the curved portion 20 on the retained portion side and in the vicinity of the male screw portion 19 or the spoke may be curved as a whole with a small curvature. Furthermore, the length of the curved portion a and the curved angle c on the retained portion side may be different from those on the male screw portion side.

Figure 10:
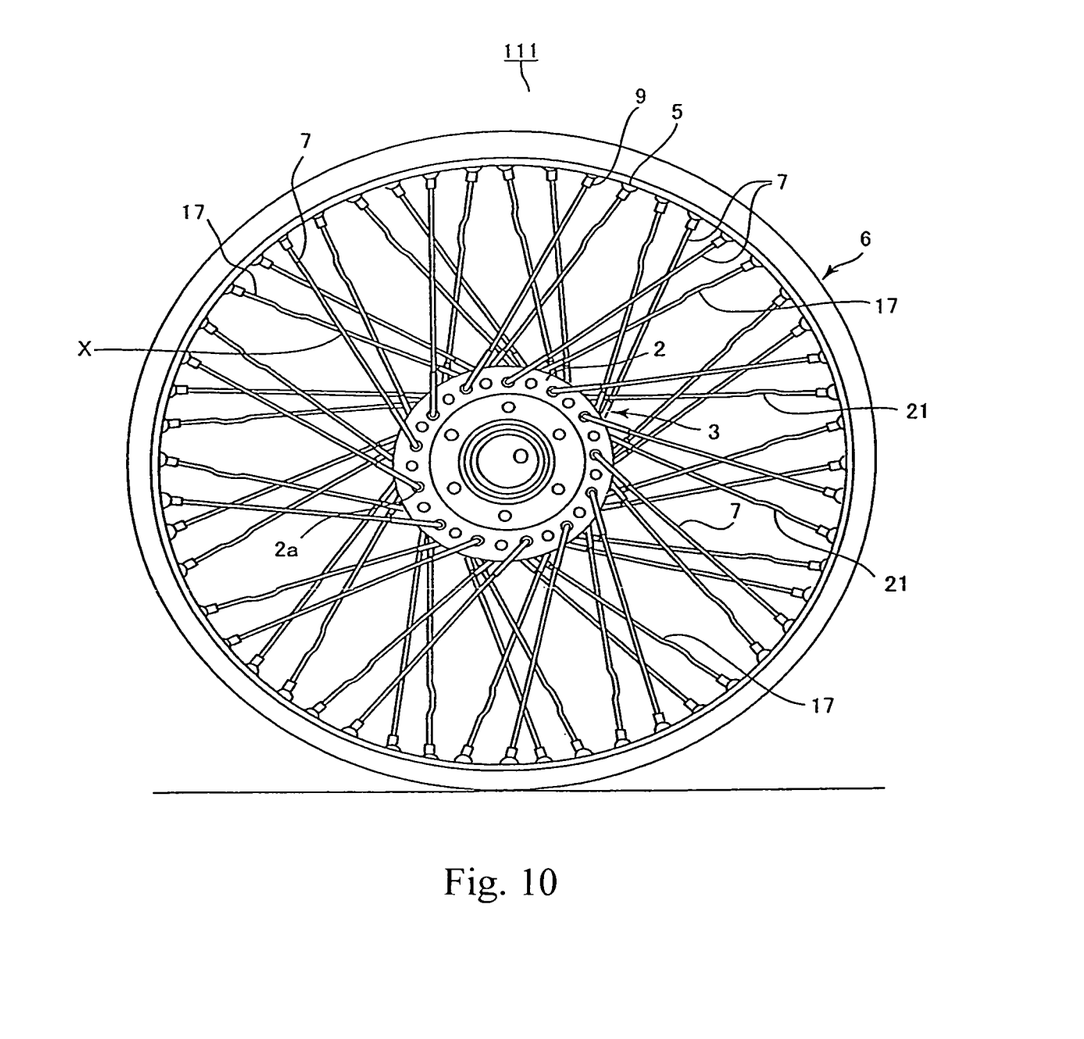
FIG. 10 is a front view of the spoke wheel of FIG. 6, in which the deformed spokes are combined with straight spokes.

In a control safety test, some drivers pointed out that they senses wobbling of the vehicle during cornering because the lateral stiffness of the spoke wheel is not enough when all of the spokes of the spoke wheel are the deformed spokes as described above depending on the preference (how to ride) of the riders and on the category of the races such as the motocross and Enduro. Then, a spoke wheel 111 in which the deformed spokes 17 and the straight spokes 7 are combined at a predetermined rate as shown in FIGS. 6 and 10 was devised.

The hub 3 has two ringed flanges $2_1$ and $2_2$ disposed so as to be distant in the axial direction by a predetermined distance and the straight spoke 7 or the deformed spoke 17 extends substantially in the tangential direction of the hub alternately in directions opposite from each other from the front or back of one flange $2_1$ or $2_2$. Accordingly, as shown in FIG. 8, a spoke $3_1$ extending from the same flange $2_1$ intersects with a fourth spoke $3_4$ (leaving the two spokes ($3_2$ and $3_3$) therebetween) (see X in FIGS. 8 and 6). It is noted that although the neighboring spokes ($3_1$ and $3_2$ for example) seem to intersect with each other near the flange when seen from the front side, it cannot be said so as to intersect because there is the thickness (distance) between the flanges.

As shown in FIG. 6 (also see FIG. 10), the straight spoke 7 is used for the spoke extending from the front side I of the flange among the spokes extending from the flange 21 or 22 and the deformed spoke 17 is used for the spoke extending from the back side R. Thereby, the ratio of the straight spokes 7 and the deformed spokes 17 in one spoke wheel 111 is 50% each and they intersect with each other at the intersections X while placing the deformed spokes 17 inside (IN) and the straight spokes 17 outside (OUT).

Thereby, while the deformed spoke 17 flexibly sustains also to a transverse load when the transverse load $J_1$ or $J_2$ acts on the rim 6 during cornering of the motorcycle, transverse deformation of the deformed spoke 17 caused by the load is supported by the straight spoke 7 having high stiffness and contacting with the deformed spoke 17 at the intersection X described above and is thus suppressed. Accordingly, the spoke wheel 111 of the invention is capable of suppressing wobbling from occurring during cornering of the motorcycle by some degree by relatively suppressing the flexible sustainment to the transverse load $J_1$ or $J_2$ while relatively maintaining the vertical stiffness, i.e., the flexible sustainment against the load F caused by jumping and the like.

Figure 7:
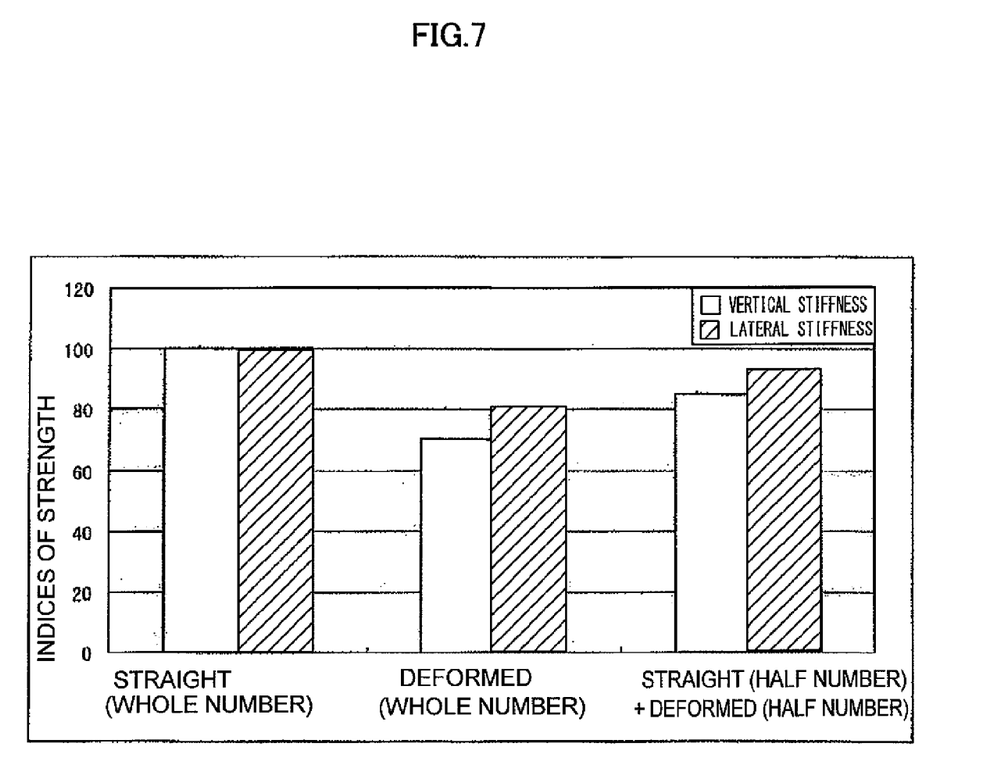
FIG. 7 is a graph showing strength indices (vertical stiffness and lateral stiffness) of the spoke wheel.

FIG. 7 is a graph showing indices of strength of the respective spoke wheels. In the graph, the vertical and lateral stiffness of the prior art spoke wheel (see FIG. 8) whose spokes are all straight spokes are indicated as 100. The vertical stiffness of the spoke wheel 11 (see FIG. 1) whose spokes are all deformed spokes is about 70 and its lateral stiffness is about 80. The spoke wheel 111 (see FIGS. 6 and 10) having the straight spokes and the deformed spokes by half each has characteristics between the spoke wheel 1 composed of only the straight spokes and the spoke wheel 11 composed of only the deformed spokes. That is, it is possible to suppress wobbling from occurring during cornering relatively while relatively maintaining the cushioning properties against jumping and the like.

It is noted that although the deformed spoke 17 is placed inside and the straight spoke 7 outside at the intersection X in the embodiment described above, they may be reversed and the deformed spoke 17 may be placed outside and the straight spoke 7 inside. Still more, the rate of the deformed spoke 17 and the straight spoke 7 is not limited to be to 50-to-50 and may be other rate such as 70-to-30, 30-to-70 and the like.

Still more, although the embodiment described above has been applied to the spoke wheel in which the retained portion of the spoke is retainably anchored to the flange of the hub and the male screw portion is fastened to the rim through the intermediary of the nipple, it is also applicable to a spoke wheel in which a retained portion of a spoke is anchored to a rim and a male screw portion is fastened to a hub through an intermediary of a nipple.

Still more, while the spoke wheels 11 and 111 are suitably used for the off-road racing motorcycles such as the motocross and Enduro, the spoke wheels are applicable also to normal off-road motorcycles, on-road motorcycles and to other vehicles such as bicycles. Still more, although the embodiment described above has been applied to the front wheel of the motorcycle, it is also applicable to a rear wheel in the same manner.

INDUSTRIAL APPLICABILITY

The spoke wheel and the deformed spoke used therein of the invention may be utilized for a wheel of motorcycles, bicycles and other vehicles.

What is claimed is:

1. A motorcycle spoke wheel, comprising:
a hub;
a rim; and
a plurality of wired spokes each having a retained portion at one end thereof and a male screw portion at another end;
each spoke being tensioned between said hub and said rim by retainably anchoring said retained portion to one of said hub and said rim and by screwing said male screw portion with a nipple retained in the other one of said hub and said rim;
at least part of said spokes being deformed spokes each having a deformed portion, deformed by a predetermined offset amount between said retained portion and said male screw portion, and having straight portions respectively formed to each side of the deformed portion on said retained portion side and on said male screw portion side, said straight portions of a given spoke being axially aligned along a common axial spoke line, the deformed portion of said given spoke deviating from said common axial spoke line; and
said deformed spoke being fastened by said nipple so that said deformed portion is elastically deformed in a manner by which said predetermined offset amount is reduced,
wherein said spokes tensioned between said hub and said rim include said deformed spokes combined with straight spokes.

2. The motorcycle, spoke wheel according to claim 1, wherein the hub has two ringed flanges disposed so as to be distant by a predetermined distance and one of a pair of spokes extending from the same flange and intersecting with each other is the deformed spoke and other one is the straight spoke.

3. The motorcycle spoke wheel according to claim 1, wherein the deformed spoke has longitudinal elastic modulus within a range of 0.3 to 0.8 times of that of the straight spoke having no deformed portion.

4. The motorcycle spoke wheel according to claim 1,
wherein the deformed portion has curved portions curved respectively by a predetermined angle with respect to the straight portions on the retained portion and male screw portion sides and a connecting portion that connects ends of these curved portions; and
wherein the predetermined offset amount is a distance between the axial line of the straight portions and the connecting portion.

5. The motorcycle spoke wheel according to claim 1, wherein the deformed spoke has longitudinal elastic modulus within a range of 0.3 to 0.8 times of that of the straight spoke having no deformed portion.

6. The motorcycle spoke wheel according to claim 2, wherein the deformed spoke has longitudinal elastic modulus within a range of 0.3 to 0.8 times of that of the straight spoke having no deformed portion.

7. The motorcycle spoke wheel according to claim 1,
wherein the deformed portion has curved portions curved respectively by a predetermined angle with respect to the straight portions on the retained portion and male screw portion sides and a connecting portion that connects ends of these curved portions; and
wherein the predetermined offset amount is a distance between the axial line of the straight portions and the connecting portion.

8. The motorcycle spoke wheel according to claim 2,
wherein the deformed portion has curved portions curved respectively by a predetermined angle with respect to the straight portions on the retained portion and male screw portion sides and a connecting portion that connects ends of these curved portions; and
wherein the predetermined offset amount is a distance between the axial line of the straight portions and the connecting portion.

9. The motorcycle spoke wheel according claim 3,
wherein the deformed portion has curved portions curved respectively by a predetermined angle with respect to the straight portions on the retained portion and male screw portion sides and a connecting portion that connects ends of these curved portions; and
wherein the predetermined offset amount is a distance between the axial line of the straight portions and the connecting portion.

10. A motorcycle spoke wheel, comprising:
a hub;
a rim; and
a plurality of wired spokes each having a retained portion at one end thereof and a male screw portion at another end;
each spoke being tensioned between said hub and said rim by retainably anchoring said retained portion to one of said hub and said rim and by screwing said male screw portion with a nipple retained in the other one of said hub and said rim;
at least part of said spokes being deformed spokes each having a deformed portion, deformed by a predetermined offset amount between said retained portion and said male screw portion; and
said deformed spoke being fastened by said nipple and tensioned between said hub and said rim so that said deformed portion is stretched to be elastically deformed in a manner by which said predetermined offset amount is reduced, and
wherein an entirety of every deformed portion for every deformed spoke occurs to one side of said common axial spoke line as referenced in a radial direction from said hub to said rim.

11. The motorcycle spoke wheel according to claim 10, wherein each deformed spoke includes straight portions and said deformed portion, a straight portion among said straight portions being formed to each side of the deformed portion on said retained portion side and on said male screw portion side, said straight portions of a given spoke being axially aligned along a common axial spoke line, the deformed portion of said given spoke deviating from said common axial spoke line at a beginning and an end of the deformed portion and not intersecting said common axial line other than at said beginning and said end.

12. The motorcycle spoke wheel according to claim 1, wherein an entirety of every deformed portion for every deformed spoke occurs to one side of said common axial spoke line as referenced in a radial direction from said hub to said rim.

* * * * *